Patented Mar. 31, 1931

1,798,781

UNITED STATES PATENT OFFICE

CHARLES BROOKS, OF EAST FALLS CHURCH, VIRGINIA, DEDICATED TO THE FREE USE OF THE PUBLIC

PROCESS OF PRESERVATION OF FRESH FRUITS AND VEGETABLES BY GAS INHIBITION AND REFRIGERATION

No Drawing.  Application filed December 15, 1930. Serial No. 502,612.

(GRANTED UNDER THE ACT OF MARCH 3, 1883, AS AMENDED APRIL 30, 1928; 370 O. G. 757)

This application is made under the act of March 3, 1883, as amended by the act of April 30, 1928, and the invention herein described may be manufactured and used by or for the Government for governmental purposes without the payment to me of any royalty thereon.

I hereby dedicate the invention herein described to the free use of the public, to take effect upon the granting of the patent.

My invention relates particularly to the prevention of the deterioration and spoilage that develop in the first 24 to 36 hours after warm fruits or vegetables are loaded in a refrigerator car, or other refrigerator container, thereby preserving the commodity in its original state, and consists essentially in holding it in an atmosphere having a higher percentage of carbon dioxide than ordinarily found under transportation and storage conditions, yet without the tightness of container, car or room, that would be necessary to develop this condition by merely retaining the respiration gases of the commodity itself.

The greatest present utility of my invention is to be found in the shipment of sweet corn, peas, beans, carrots, grapes, berries, peaches, plums, and cherries, but it may be used with other fruits and vegetables and may be used in storage chambers as well as in transit.

There are at present heavy losses in the shipment of the more perishable food products, due to the development of Rhizopus, Manilia, Botrytis and other rot and spoilage organisms. There is also loss from diseases of a physiological nature, and from types of breakdown and old age; loss resulting from undue softening of the plant tissue and deterioration resulting from rapid consumption of sugars in respiration. These conditions are due to the slow cooling of the product and the resulting high temperatures that usually prevail during the first 24 to 36 hours after loading or storage. The process covered by my invention reduces the loss and deterioration by the inhibition of plant activity during this period by means of an increase in the carbon dioxide content of the storage air.

The increase in carbon dioxide above the percentage that would result from the respiration of the commodity may be obtained from direct chemical action, from the commercial carbon dioxide cylinder, or from solid carbon dioxide. Solid carbon dioxide furnishes the most convenient means at present available for securing carbon dioxide gas under control, and in the required amount. If a large amount of solid carbon dioxide is freely exposed a high percentage of gas is obtained for a short time, and if a smaller amount is enclosed in paper, cardboard or other container, a slight flow of carbon dioxide gas can be secured over a longer period. The percentage of gas can thus be modified to suit the tolerance of the particular food product and the conditions of shipment or storage.

With food products that will stand a high percentage of the gas even for a short time, the solid carbon dioxide can be used as a pre-cooling agent as well as a source of carbon dioxide gas, and this pre-cooling furnishes an additional means of checking spoilage. Solid carbon dioxide has an advantage over water ice in the fact that it can be placed on top of the load of fruit or vegetables inside the refrigerator car or storage chamber, and thus be made to pre-cool the top layer and prevent spoilage at the very point where it is most likely to occur. The carbon dioxide gas, however, spreads fairly evenly throughout the car or container and has an inhibiting effect at all points.

The following is an illustration of a method of use which has been tested in experimental shipments: Immediately after loading the warm fruits or vegetables, between 300 to 500 pounds of solid carbon dioxide was placed in crates, or other containers, on top of the shipments. Within one-half to one hour's time, the carbon dioxide content of the storage air was found to have risen to between 25 or 30 per cent, resulting in an almost complete inhibition of rot organisms and of the softening of the fruit. By the end of 24 hours, the carbon dioxide fell to about 10 per cent, and by the end of 36 hours had entirely disappeared. In the meantime the processes of spoilage had been brought under control by means of water ice or other standard means of refrigeration.

Having thus fully and clearly described my invention, what I claim as new and desire to secure by Letters Patent is:

A process of preserving fresh food products such as fruits and vegetables during the period in which said products are being chilled down from a warm state to a proper low temperature suitable for preservation, which consists of the steps cooling said food products and simultaneously submerging said products in an atmosphere having a carbon dioxide content of from 15 to 40 percent at the beginning of said cooling and gradually decreasing said carbon dioxide content to from 10 to 0 percent at the time said products are brought to said proper low temperature of preservation.

CHARLES BROOKS.